United States Patent [19]

Eagan, Sr.

[11] 4,261,228

[45] Apr. 14, 1981

[54] STROKE ADJUSTMENT FOR RECIPROCATING MECHANISM

[76] Inventor: Joseph A. Eagan, Sr., 539 Ford St., West Conshohocken, Pa. 19428

[21] Appl. No.: 969,014

[22] Filed: Dec. 13, 1978

[51] Int. Cl.³ .............................................. F16H 35/08
[52] U.S. Cl. ...................................... 74/835; 92/13.7; 74/571 R; 74/600
[58] Field of Search ............ 74/571 R, 571 M, 571 L, 74/600, 835; 92/13.7

[56] References Cited

U.S. PATENT DOCUMENTS

| 2,346,964 | 4/1944 | Harper . | |
|---|---|---|---|
| 2,640,425 | 6/1953 | Saalfrank . | |
| 2,855,521 | 10/1958 | Blackstone | 74/600 UX |
| 2,892,360 | 6/1959 | Ill | 92/13.7 |
| 3,116,648 | 1/1964 | Arenhold | 74/600 |
| 3,119,280 | 1/1964 | Mann et al. . | |
| 3,398,691 | 8/1968 | Sato et al. . | |
| 3,510,235 | 5/1970 | Bensinger et al. . | |
| 3,527,550 | 9/1970 | Flynn et al. . | |
| 3,698,288 | 10/1972 | Sonobe . | |
| 3,906,842 | 9/1975 | Sonobe . | |
| 3,974,714 | 8/1976 | Fritsch | 74/571 L |

FOREIGN PATENT DOCUMENTS 581862  9/1958  Italy .......................................... 92/13.7

Primary Examiner—Kenneth Dorner
Attorney, Agent, or Firm—Weiser, Stapler & Spivak

[57] ABSTRACT

A stroke adjustment for reciprocating mechanisms which includes an external adjusting wheel to vary internally the longitudinal position of a carrier through an interconnected shaft and gear. A butterfly arm is pivotally connected to the power shaft and is pivoted by the carrier to raise or lower one end of a connected crank to vary the length of the piston stroke by changing the eccentricity of the crank.

14 Claims, 5 Drawing Figures

STROKE ADJUSTMENT FOR RECIPROCATING MECHANISM

BACKGROUND OF THE DISCLOSURE

The present invention relates generally to the field of reciprocating mechanisms, and more particularly, is directed to a stroke adjustment system to vary the stroke of a piston while the apparatus is in full operation.

The present invention is directed to a running stroke adjustment for reciprocating apparatus such as proportioning pumps, coal stokers, container fillers, reciprocating engines and the like wherein an eccentric connection is commonly employed to transmit rotary motion into reciprocating motion through a crank. In most prior art reciprocating pump mechanisms, the pump eccentric could not be adjusted and the stroke of the piston was not readily varied. Accordingly, only a fixed output or capacity could usually be designed in each unit.

More recently, when the need for stroke adjustment and variable output became desirable, other workers in the field attempted to develop suitable mechanisms to facilitate stroke adjustment for reciprocating mechanisms to meet the growing need. Particularly, in U.S. Pat. No. 3,398,691, a volume controlled pump was disclosed which included an external handle to rotate an adjusting shaft which inturn rotated a pinion for stroke adjustment purposes. An oblique shaft member formed an eccentric shaft and was movable for pump volume variation purposes. Another stroke adjustment apparatus was developed in U.S. Pat. No. 2,346,964 wherein a head was slidably mounted in a guideway. A slidable block was movable alson the guideway upon turning an external handwheel to provide stroke adjustment and consequently also to provide volume control.

In U.S. Pat. No. 3,119,280, a reciprocating pump with external knob adjustment was disclosed in combination with a gear linkage to adjust pump stroke length. In U.S. Pat. No. 3,698,288, a variable metering pump was disclosed which utilized a crank having offset means to vary the length of the stroke.

While these prior developments in the art have generally been directed to solve the same problem with which the present application is concerned, the heretofore developed mechanisms were all complicated in nature and expensive in construction. Additionally, some suffer from deficiencies such as the inability to vary stroke adjustment while the mechanism is in operation.

SUMMARY OF THE INVENTION

The present invention relates generally to the field of reciprocating apparatus, and more particularly, is directed to a stroke adjustment construction to vary the piston stroke length to achieve volume control while the apparatus is in operation.

The stroke adjustment of the present invention is particularly adaptable to reciprocating, proportioning pumps and includes means to vary the eccentricity of the crank to increase or decrease the length of the piston stroke and accordingly the output of the apparatus.

In the preferred embodiment, an adjusting handwheel extends exteriorly of the pump body to rotatively function an adjusting rod or shaft which extends interiorly within the casing. Secured to the interior end of the rod is an adjusting gear which is rotated as the adjusting rod is turned by the handwheel. The adjusting gear is in mesh with gear teeth provided in a threaded carrier to turn the threaded carrier as the adjusting gear is rotated. The threaded carrier comprises external threads which are engaged with internal threads formed in the pump body to longitudinally traverse the threaded carrier in response to rotative forces generated at the external handwheel. The threaded carrier in turn longitudinally moves a rotating spindle which is formed with a collar having an arcuate slot therein. A butterfly rotating link is pivoted to the power shaft through a pin and includes an upper pin which rides within the arcuate slot of the collar. As the threaded collar is longitudinally moved, the interaction of the upper pin within the slot rotates the butterfly link about its pivot in a manner to raise or lower the connected end of the crank. This in turn causes either increased or decreased eccentricity while the pump is running to thereby vary the length of the piston stroke and accordingly varies the output of the pump. It is thus seen that a relatively simply constructed adjusting apparatus can be employed to adjust pump volume output while the pump is running.

It is therefore an object of the present invention to provide an improved stroke adjustment for reciprocating mechanisms.

It is another object of the present invention to provide a novel stroke adjustment for reciprocating mechanisms that incorporates means to vary stroke length while the mechanism is running.

It is another object of the present invention to provide a novel running stroke adjustment for reciprocating mechanisms, such as proportioning pumps which includes an external handwheel which functions an internal adjusting rod to vary crank eccentricity and thus the length of piston stroke while the apparatus is operating.

It is another object of the present invention to provide a novel stroke adjustment for reciprocating, proportioning pumps comprising an internal rotating butterfly link pivotal about a power shaft affixed pivot and means to pivot the butterfly link whereby the butterfly link raises and lowers one end of the crank to vary crank eccentricity and the length of piston stroke.

It is another object of the present invention to provide a stroke adjustment mechanism for running reciprocating pumps which comprises an external adjusting handwheel, an internal gear which is longitudinally movable upon rotation of the handwheel, the internal gear in turn moving a threaded carrier to longitudinally adjust a spindle having a slot, a pin positioned within the slot to rotate a butterfly link about its pivot whereby the end of the crank secured to the butterfly link may be raised or lowered as desired to vary crank eccentricity.

It is another object of the present invention to provide a novel running stroke adjustment for reciprocating, proportioning pumps that is simple in design, rugged in construction and trouble-free when in use.

Other objects and a fuller understanding of the invention will be had by referring to the following description and claims of a preferred embodiment thereof, taken in conjunction with the accompanying drawings, wherein like reference characters are employed to designate similar parts throughout the several views and in which:

DESCRIPTION OF THE PREFERRED EMBODIMENT OF THE INVENTION

Figure 1:
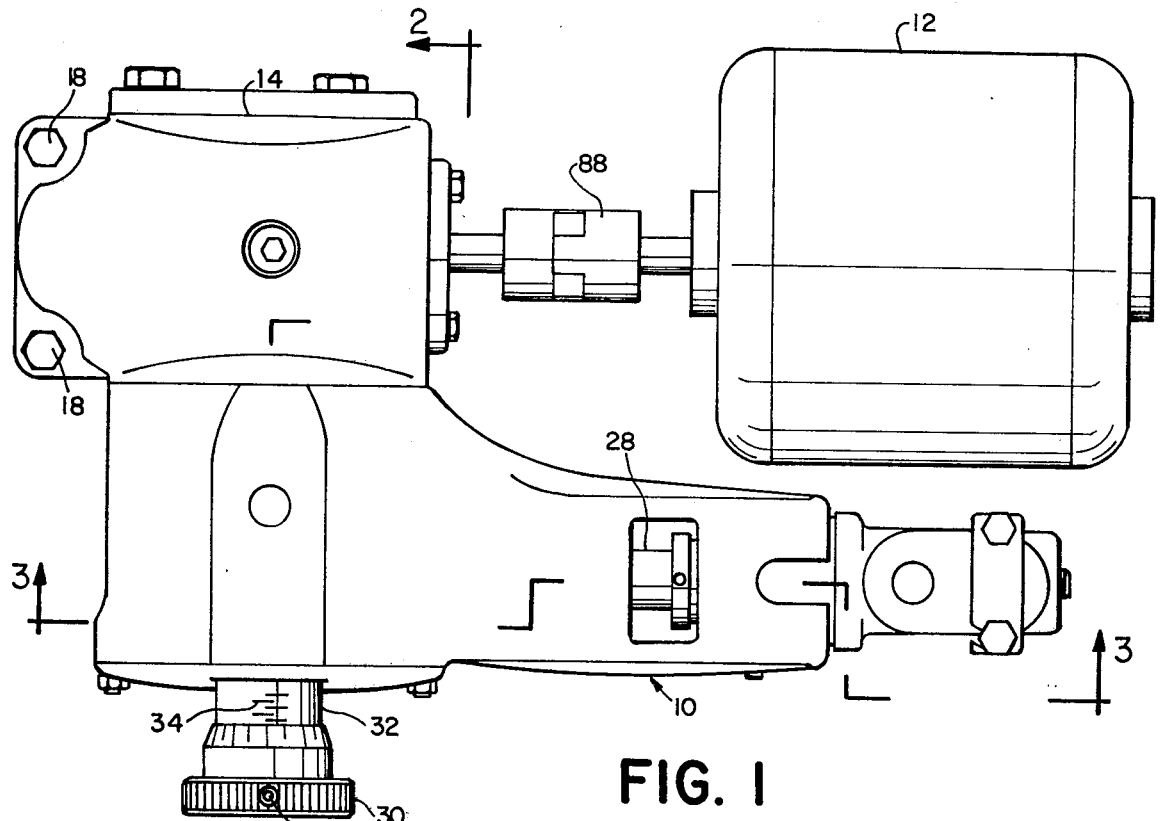
FIG. 1 is a top plan view of the invention as applied to a reciprocating, proportioning pump.

Although specific terms are used in the following description for the sake of clarity, these terms are intended to refer only to the particular structure of the invention selected for illustration in the drawings, and are not intended to define or limit the scope of the invention.

Figure 2:
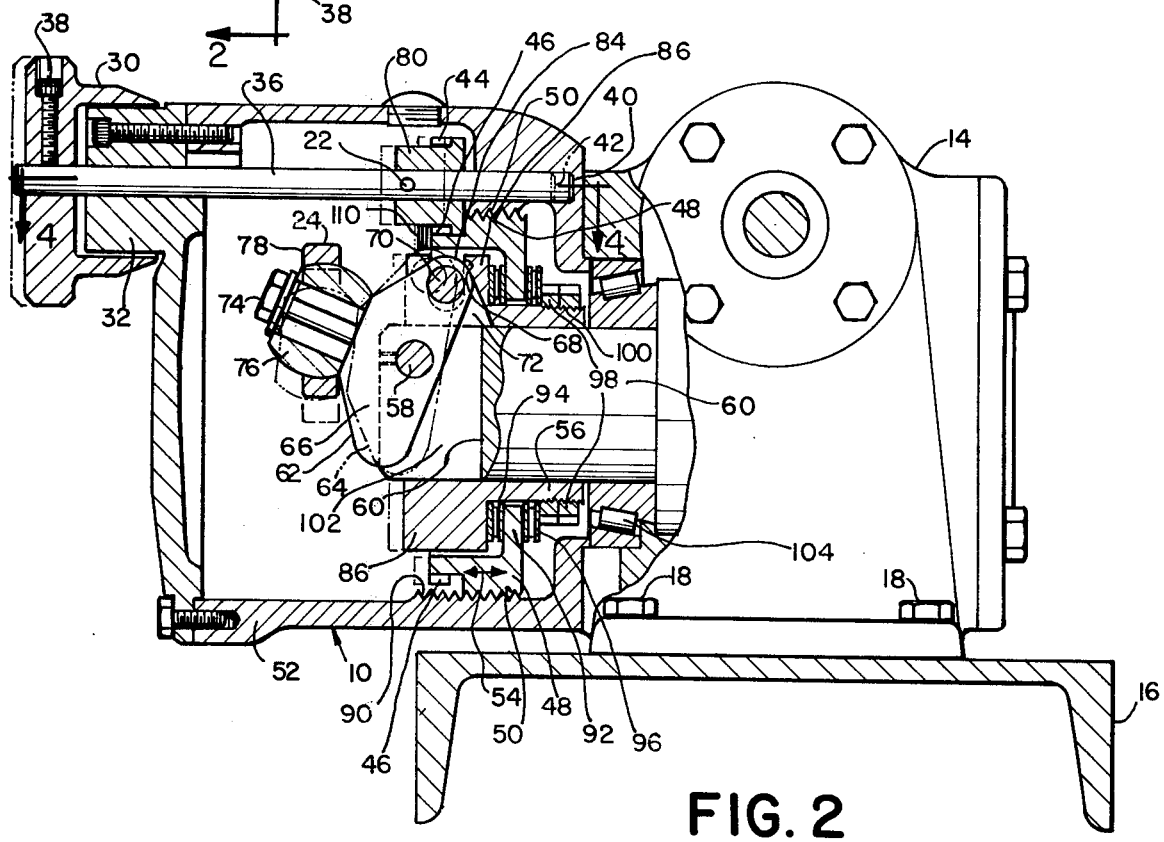
FIG. 2 is a cross-sectional view taken along 2—2 of FIG. 1, looking in the direction of the arrows.
Figure 3:
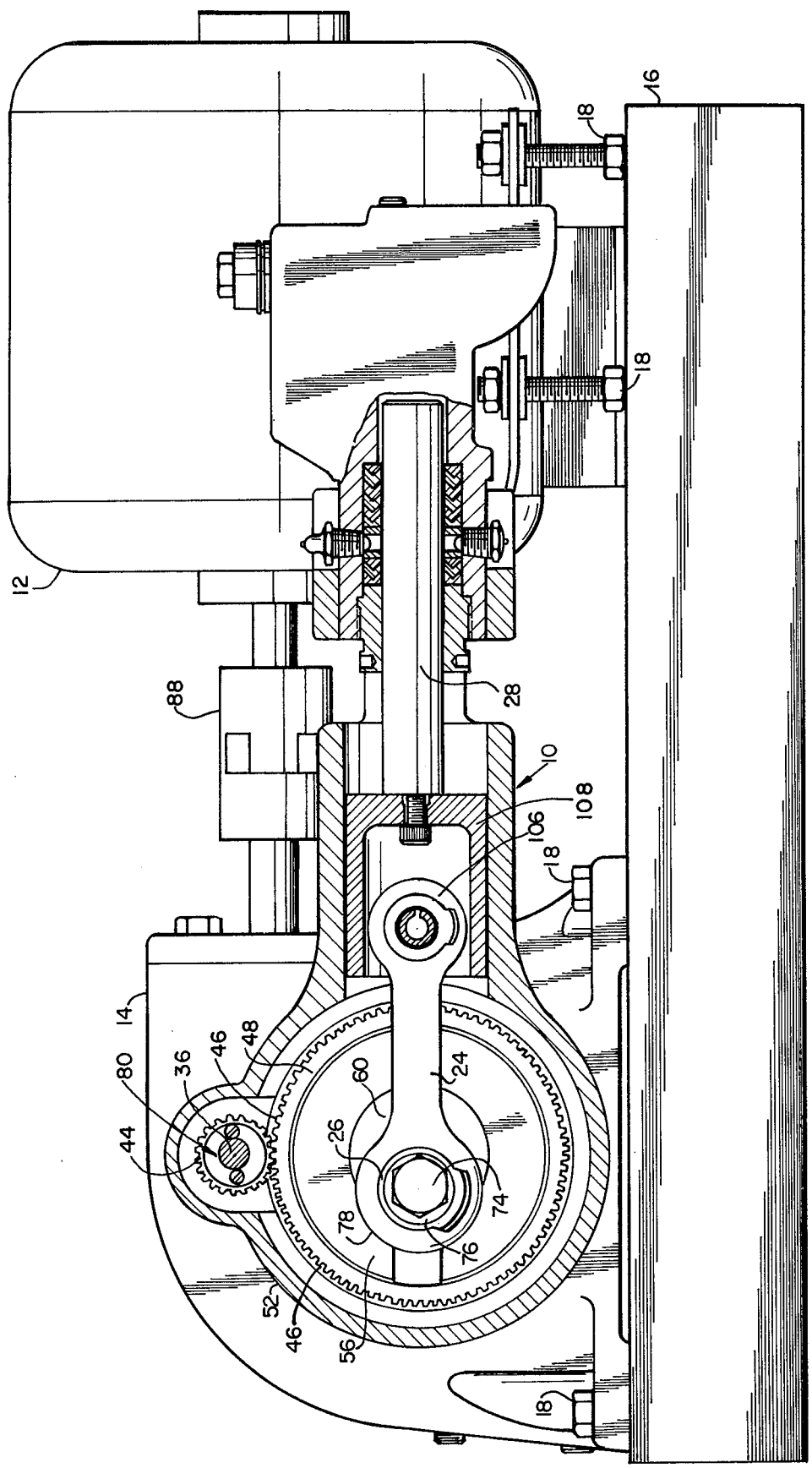
FIG. 3 is a cross-sectional view taken along line 3—3 of FIG. 1, looking in the direction of the arrows.

Referring now to the drawings, there is illustrated a reciprocating pump which, for the purposes of illustration, is a reciprocating, proportioning pump. It will be appreciated that although for illustrative purposes a reciprocating pump mechanism will be described, other reciprocating apparatus requiring stroke adjustment could be similarly treated and still fall within the intent and scope of this invention. In conventional manner, the pump 10 is driven by an electric motor 12 through a flexible coupling 88 to a gear reduction system 14. The motor, gear reducer and pump are suitably secured to a structural steel supporting base 16 in conventional manner such as by employing a plurality of bolts 18. In the usual manner, the power shaft 60 receives rotative power through the gear reducer 14 and rotatively drives the butterfly arm 66. The crank 24 is reciprocally driven upon rotation of the arm 66 through an eccentric ball connector 76 to reciprocate the piston 28 for fluid pumping in the usual manner. As shown in FIG. 2, the power shaft 60 is rotatively carried within the pump casing 52 by a conventional thrust bearing 104. FIG. 3 shows the crank 24 connected at its connected end 78 to the connector 76 and at its pump end 106 connected to the slide 108 to thereby reciprocate the attached piston 28.

As best seen in FIGS. 1 and 2, an adjusting handwheel 30 is rotatable about the spindle 32 upon which is engraved or otherwise marked a calibrating scale 34 for pump volume control purposes. The handle 30 is securely pinned or otherwise affixed to the adjusting shaft 36 in suitable manner, such as by employing a set screw 38. The operating shaft 36 is axially movable from a full inward position 40 as illustrated in FIG. 2 in full lines to an adjusted outer position 42 as illustrated in FIG. 2 in phantom lines. A gear 80 is pinned or otherwise securely affixed at 22 to the adjusting shaft 36 so that the gear 80 is rotated upon rotation of the adjusting handle 30. The teeth 44 of the adjusting gear 80 mesh with the gear teeth 46 provided in the threaded carrier 48 in a manner to rotate the carrier 48 either clockwise or counterclockwise, depending upon the direction of rotation of the operating handle 30. A thrust collar 110 or other suitable construction maintains the adjusting gear 80 in association with the threaded carrier 48 whereby the shaft 36 will be axially movable between the positions 40, 42 as the threaded carrier is axially moved along the threaded paths defined by the interaction of the carrier threads 50 and the casing threads 90.

Figure 4:
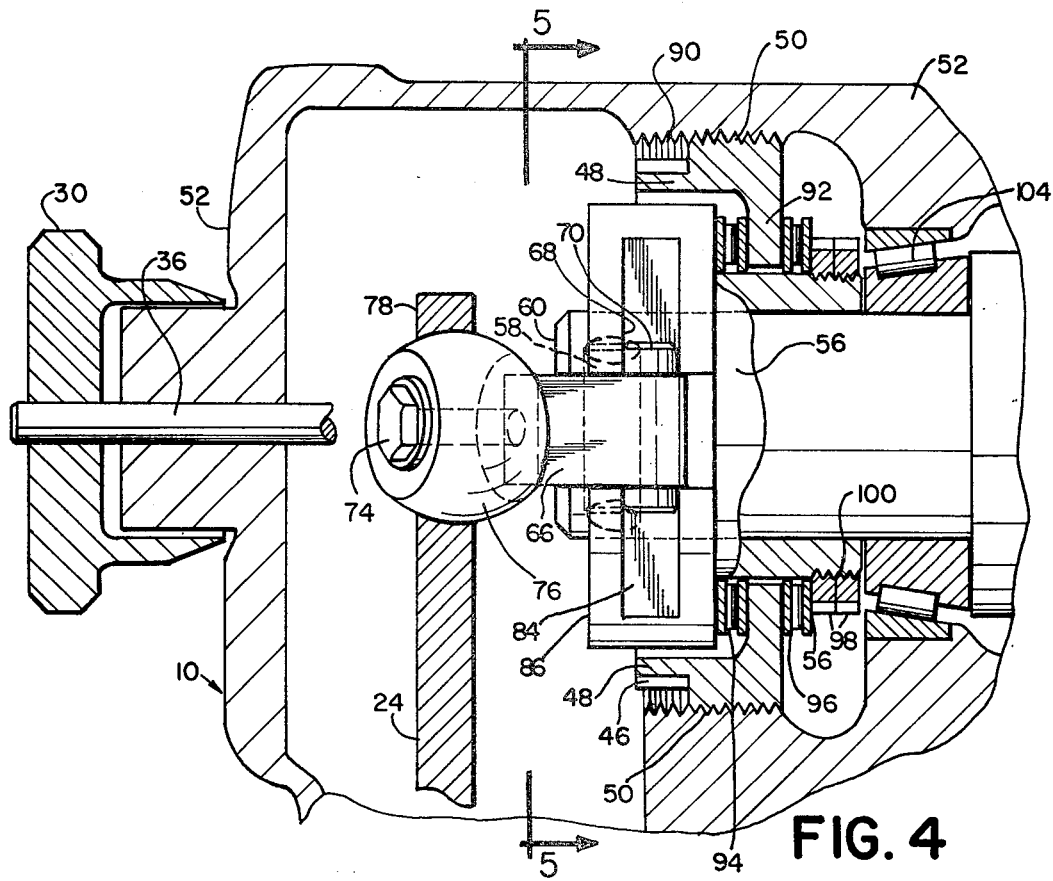
FIG. 4 is a partial, enlarged, cross-sectional view taken along line 4—4 of FIG. 2, looking in the direction of the arrows.
Figure 5:
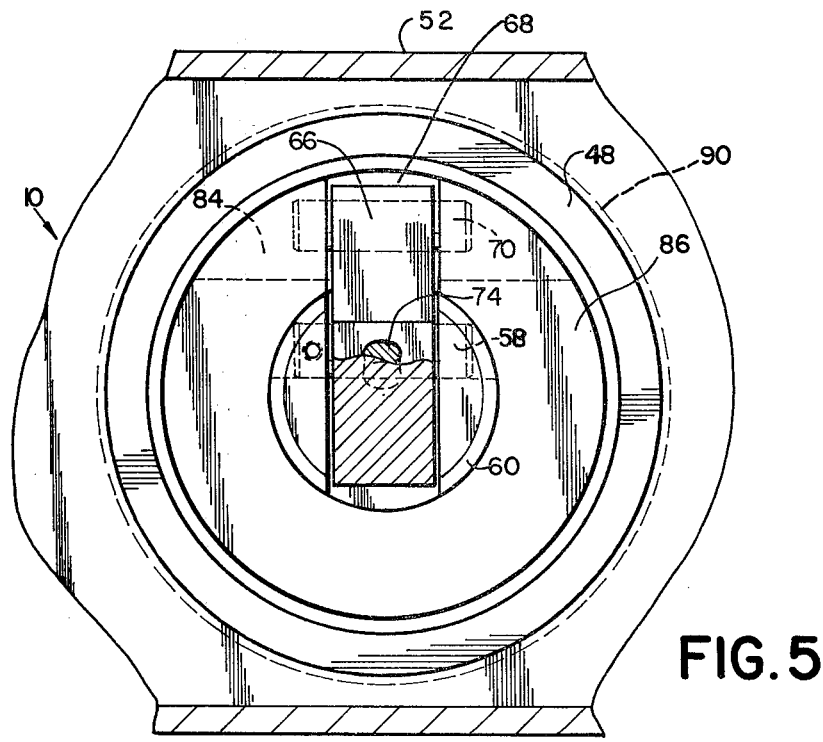
FIG. 5 is a partial cross-sectional view taken along line 5—5 of FIG. 4, looking in the direction of the arrows.

As best seen in FIGS. 2 and 4, threaded carrier 48 includes an externally threaded section 50, which section is threadedly engaged in the interior threaded section 90 formed in the pump casing 52. Thus, rotation of the handle 30 directly causes axial movement of the carrier 48 in the directions indicated by the two-headed arrow 54. The carrier 48 includes a radially extending section 92 which engages the hub 56 of the movable collar 86. The section 92 is carried within the bearings 94, 96 which are secured in place by one or more lock nuts 98. Preferably, hub 56 is exteriorly threaded at 100 to threadedly receive the lock nuts 98.

A butterfly arm 66 pivotally mounts upon the pivot pin 58 and is rotative thereabout between the positions illustrated in full lines 62 and in phantom lines 64 in FIG. 2. The pivot pin 58 is secured in the power shaft 60 to permit pivotal movement of the butterfly arm 66 thereabout as indicated at 62, 64. The end of the power shaft is machined or otherwise formed to provide an endwardly open slot or groove 102 of sufficient width to permit pivotal movement of the butterfly arm 66 therewithin. A second pin 70 projects laterally from the butterfly arm 66 in spaced relationship from the pivot pin 58 to pivotally urge the arm 66 about the pivot pin 58 as the collar is axially moved upon rotation of the handle 30.

Thus, as the threaded carrier 48 is urged axially in the direction of the arrow 54, the engagement of the radially extending section 92 and the collar 86 at the bearings 94, 96 causes the collar 86 also to move axially in the direction indicated by the arrow 54. The collar is circularly formed and is provided with an upwardly open arcuate slot 84 which is sized to receive the butterfly arm upper pin 70 therewithin. The collar 86 is provided with an opening 68 which extends through the slot 84 of sufficient width to receive the upper end of the butterfly arm 66 therewithin in a sliding engagement to permit movement of the butterfly arm therethrough as the arm 66 is pivoted about its pin 58.

As previously set forth, the pin 70 is a sliding fit within the arcuate slot 84 of the collar 86. Accordingly, as the collar 86 is urged axially in the directions indicated by the arrow 54 by threaded rotation of the carrier 48, the butterfly crank 66 will be rotated about the fixed pivot 58. The arcuate slot 84 and the upper pin 70 interfit as necessary to facilitate pivotal rotation of the butterfly arm 66 about its pivot pin 58 for stroke adjustment purposes as the butterfly arm and the collar are rotated in unison by the power shaft 60 through the pin 58.

The pump crank 24 is secured to the butterfly arm 66 by utilizing a suitable bolt 74 and a ball connector 76. The ball connector 76 is fabricated to suitable diameter to provide a peripherally sliding engagement with the crank 24 as the butterfly arm 66 is pivoted about the pin 58 for stroke adjustment purposes.

The geometry of the system is designed to raise and lower the ball connector 76 as indicated in FIG. 2 through the range incicated by full lines and phantom lines as the butterfly arm 66 is pivotally rotated about its power shaft affixed pivot pin 58. This in turn causes the connected end 78 of the crank 24 also to be raised or lowered thereby to vary the eccentricity of the crank 24 relative to the pump power shaft 60. This in turn varies the stroke of the piston 28 whereby precise running adjustment of the volumetric effluent from the pump 10 can be closely regulated. As the butterfly arm 66 is pivoted downwardly, the effective stroke of the crank 24 will be shortened, thereby reducing the stroke of the piston 28 and hence the output of the pump. Similarly, when the butterfly arm 66 is pivoted upwardly, the effective stroke of the crank 24 will be lengthened to thus cause a corresponding increase in the volumetric output of the pump.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather, only by the scope of the claims appended hereto.

What is claimed is:

1. In a stroke adjustment for reciprocating mechanisms of the type including a crank, a piston reciprocated by the crank and a power shaft supplying rotary power, the combination of
    an arm connected to the power shaft in a pivotal power shaft connection and being adapted to be rotated by the power shaft,
        said arm comprising an adjustable connector to which one end of the crank is connected and a projecting pin positioned in spaced relationship from the pivotal power shaft connection;
    a collar axially movable along the power shaft, said collar including slot means slidingly engageable by the projecting pin, the engagement of the projecting pin within the slot means causing rotation of the arm about its pivotal power shaft connection as the collar is axially moved; and
    an adjustment means adjacent to the collar to axially move the collar relative to the power shaft,
        the adjustment means comprising an external handle, an adjusting shaft adapted to be rotated by the handle and gear means interposed between the adjusting shaft and the collar to axially move the collar along the power shaft in response to rotation of the handle, and
        the adjustment means further comprising threaded means interposed between the gear means and the collar to axially move the collar along the power shaft in response to rotation of the handle;
    whereby movement of the collar in a first axial direction causes the engaged pin to pull the arm in a clockwise direction about its pivotal power shaft connection to raise the adjustable connector and thus vary the eccentricity of the crank, and
    whereby movement of the collar in the opposite axial direction causes the engaged pin to push the arm in a counterclockwise direction about its pivotal power shaft connection to lower the adjustable connector and thus vary the eccentricity of the crank.

2. The stroke adjustment for reciprocating mechanisms of claim 1 comprising a body within which the arm is rotated, said body comprising interior threads, the said threaded means comprising a threaded carrier, the threaded carrier being threadedly engaged upon the said body interior threads to move the threaded carrier as the handle is rotated.

3. The stroke adjustment for reciprocating mechanism of claim 2 wherein the interior threads are axially extending whereby rotation of threaded means relative to the interior threads causes the threaded means to move axially relative to the body.

4. The stroke adjustment for reciprocating mechanism of claim 3 wherein the threaded means comprise a radially extending section, the radially extending section projecting radially inwardly toward the collar.

5. The stroke adjustment for reciprocating mechanism of claim 4 wherein the radially extending section is secured to the collar to urge the collar axially as the threaded means is moved axially.

6. The stroke adjustment for reciprocating mechanism of claim 5 and bearing means interposed between the threaded means and the collar to permit the collar to be rotated relative to the threaded means when the power shaft is rotated.

7. The stroke adjustment for reciprocating mechanism of claim 3 wherein the handle is moved axially by the threaded means as the threaded means is axially moved.

8. The stroke adjustment for reciprocating mechanisms of claim 10 wherein the body is provided with an axially aligned scale and the handle is positioned to move axially over the scale, whereby the distance of axial movement of the handle can be determined.

9. The stroke adjustment for reciprocating mechanism of claim 1 wherein the adjustment means is adapted to axially move the collar when the power shaft is rotating.

10. The stroke adjustment for reciprocating mechanisms of claim 1 wherein the slot means is arcuately formed and is outwardly open whereby the projecting pin can ride radially within the slot means as the collar is axially moved.

11. The stroke adjustment for reciprocating mechanisms of claim 10 wherein the collar is formed to an annular configuration defining a central opening through which the power shaft projects.

12. The stroke adjustment for reciprocating mechanisms of claim 11 wherein the slot means terminates radially outwardly from the central collar opening.

13. The stroke adjustment for reciprocating mechanisms of claim 12 wherein the collar includes a vertical opening extending radially outwardly from the central opening and communicating with the slot means and wherein the arm is positioned within the vertical opening and is pivotally arranged therewithin.

14. The stroke adjustment for reciprocating mechanisms of claim 1 wherein the end of the power shaft is provided with a slot and wherein the arm is pivotally connected within the slot.

* * * * *